(12) United States Patent
Kuhlbach

(10) Patent No.: US 10,315,584 B2
(45) Date of Patent: Jun. 11, 2019

(54) MOBILITY UNIT, MOTOR VEHICLE, CARRIER, AND SMALL VEHICLE

(71) Applicant: FORD MOTOR COMPANY, Dearborn, MI (US)

(72) Inventor: Kai Sebastian Kuhlbach, Bergisch Gladbach NRW (DE)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 15/722,156

(22) Filed: Oct. 2, 2017

(65) Prior Publication Data

US 2018/0093617 A1 Apr. 5, 2018

(30) Foreign Application Priority Data

Sep. 30, 2016 (DE) .................. 10 2016 219 028

(51) Int. Cl.
| | |
|---|---|
| *B60R 9/06* | (2006.01) |
| *B60R 9/10* | (2006.01) |
| *B60L 53/14* | (2019.01) |
| *B60L 50/20* | (2019.01) |
| *B60L 53/30* | (2019.01) |
| *B60L 53/60* | (2019.01) |

(52) U.S. Cl.
CPC ................ *B60R 9/06* (2013.01); *B60L 50/20* (2019.02); *B60L 53/14* (2019.02); *B60L 53/30* (2019.02); *B60L 53/60* (2019.02); *B60R 9/10* (2013.01); *B60L 2200/12* (2013.01); *B60L 2200/28* (2013.01)

(58) Field of Classification Search
CPC . B60R 9/06; B60R 9/10; B60L 11/007; B60L 11/1816; B60L 11/1838; B60L 2230/10; B60L 2200/28; B60L 2200/12
See application file for complete search history.

(56) References Cited

U.S. PATENT DOCUMENTS

| | | | | |
|---|---|---|---|---|
| 4,199,037 A | * | 4/1980 | White ............... | B60K 3/04 180/65.245 |
| 4,275,981 A | * | 6/1981 | Bruhn ............... | B60R 9/10 224/402 |
| 4,646,952 A | * | 3/1987 | Timmers ........... | B60R 9/06 224/485 |
| 5,559,420 A | * | 9/1996 | Kohchi ............. | B60K 1/04 180/65.1 |

(Continued)

FOREIGN PATENT DOCUMENTS

| | | |
|---|---|---|
| CN | 204031335 U | 12/2014 |
| DE | 19952813 A1 | 8/2000 |

(Continued)

*Primary Examiner* — Jacob B Meyer
(74) *Attorney, Agent, or Firm* — Gregory P. Brown; Brooks Kushman, P.C.

(57) ABSTRACT

There is provided a carrier that fits on a motor vehicle and receives a small vehicle. The carrier includes a console on which the small vehicle can be arranged. According to the disclosure, the carrier also includes a carrier coupling component that is constructed to be connected in a positive-locking manner to a small vehicle coupling component of the small vehicle, above the console. The motor vehicle having the carrier and the small vehicle forms a mobility unit according to the disclosure.

18 Claims, 2 Drawing Sheets

(56) References Cited

U.S. PATENT DOCUMENTS

| | | | | |
|---|---|---|---|---|
| 5,699,985 | A * | 12/1997 | Vogel | B60R 9/06 224/521 |
| 5,839,875 | A * | 11/1998 | Miller | B60P 3/07 414/462 |
| 5,899,655 | A * | 5/1999 | Miller | B60P 3/07 224/510 |
| 5,906,386 | A * | 5/1999 | Baker | B60P 3/122 280/402 |
| 6,037,746 | A * | 3/2000 | Sheng | B60L 11/007 320/104 |
| 6,139,247 | A * | 10/2000 | Wright | B60R 9/06 224/519 |
| 6,390,215 | B1 * | 5/2002 | Kodama | B60K 1/04 180/2.1 |
| 6,695,184 | B2 * | 2/2004 | Higginbotham, III | B60R 9/06 224/501 |
| 6,938,400 | B2 * | 9/2005 | Fillman | A01D 34/58 56/10.6 |
| 7,279,640 | B2 * | 10/2007 | White | B60D 1/62 174/135 |
| 7,514,803 | B2 * | 4/2009 | Wilks | B60L 11/1822 180/165 |
| 7,726,160 | B2 * | 6/2010 | Gagosz | B62H 3/00 211/5 |
| 8,272,547 | B1 * | 9/2012 | Mital | B60R 9/10 224/501 |
| 8,308,181 | B2 * | 11/2012 | Riibe | B60D 1/62 280/422 |
| 8,827,128 | B2 * | 9/2014 | Degenstein | B60R 9/06 224/496 |
| 9,321,357 | B2 * | 4/2016 | Caldeira | B60L 11/1801 |
| 9,457,630 | B2 * | 10/2016 | Anderson | B60D 1/58 |
| 9,457,666 | B2 * | 10/2016 | Caldeira | B60L 3/0046 |
| 9,658,076 | B2 * | 5/2017 | Aich | G01C 21/3469 |
| 9,873,408 | B2 * | 1/2018 | Capizzo | H02J 7/0042 |
| 9,887,570 | B2 * | 2/2018 | Johnsen | B60L 11/005 |
| 9,970,778 | B2 * | 5/2018 | Aich | G01C 21/3469 |
| 10,106,003 | B2 * | 10/2018 | Cardenas | B60D 1/64 |
| 2003/0164390 | A1 * | 9/2003 | Higginbotham, III | B60R 9/06 224/519 |
| 2004/0238582 | A1 * | 12/2004 | Pedrini | B60R 9/10 224/519 |
| 2005/0136726 | A1 * | 6/2005 | Kohchi | H01R 13/7036 439/352 |
| 2006/0231581 | A1 * | 10/2006 | Jones | B60R 9/06 224/403 |
| 2008/0006665 | A1 * | 1/2008 | Bergerhoff | B60R 9/06 224/497 |
| 2008/0011795 | A1 * | 1/2008 | Howorth | B60R 9/06 224/321 |
| 2010/0045012 | A1 * | 2/2010 | Lungershausen | B60R 9/06 280/769 |
| 2010/0065344 | A1 * | 3/2010 | Collings, III | B60L 3/10 180/2.1 |
| 2010/0084532 | A1 * | 4/2010 | Nielsen | F16L 1/11 248/346.03 |
| 2011/0253463 | A1 * | 10/2011 | Smith | B60D 1/00 180/11 |
| 2013/0257144 | A1 * | 10/2013 | Caldeira | B60L 11/1801 307/9.1 |
| 2014/0354419 | A1 | 12/2014 | Frier | |
| 2018/0093617 | A1 * | 4/2018 | Kuhlbach | B60L 11/1816 |

FOREIGN PATENT DOCUMENTS

| | | |
|---|---|---|
| DE | 102006036856 A1 | 2/2008 |
| DE | 102007017164 A1 | 10/2008 |
| DE | 202008011504 U1 | 12/2008 |
| DE | 202011106704 U1 | 1/2012 |
| DE | 102011011252 A1 | 8/2012 |
| DE | 102012012889 A1 | 1/2014 |
| WO | 2000026059 A2 | 5/2000 |

* cited by examiner

MOBILITY UNIT, MOTOR VEHICLE, CARRIER, AND SMALL VEHICLE

CROSS-REFERENCE TO RELATED APPLICATIONS

This application claims foreign priority benefits under 35 U.S.C. § 119(a)-(d) to DE Application 10 2016 219 028.8 filed Sep. 30, 2016, which is hereby incorporated by reference in its entirety.

TECHNICAL FIELD

The present disclosure relates to a mobility unit, which includes a motor vehicle, a small vehicle and a carrier for the small vehicle.

BACKGROUND

DE 102011011252 A1 discloses that various load carrier systems for motor vehicles, for instance, for carrying one or more bicycles or similar means of transport, exist. Thus, there is, for example, already known from DE 102007017164 A1 a load carrier for pulling out of a vehicle rear, wherein a carrier frame is guided on at least one elongate element, which is provided with a pivot axis and can be longitudinally displaced through the bumper of a motor vehicle, or is guided below the bumper of the motor vehicle.

DE 102011011252 A1 itself relates to a load carrier system, in particular for pulling out of a motor vehicle rear, which is constructed for receiving at least one object, preferably one or more electric bicycles or electric scooters. The load carrier system has a carrier frame for receiving at least one object. The load carrier system is further provided with an energy supply device, which enables, and accordingly provides, for electrical energy to be supplied to an object that is received by the carrier frame or that can be secured thereto. The load carrier system may, for example, be arranged as a roof luggage carrier or rear luggage carrier at the outer side on the vehicle bodywork. Preferably, the carrier frame of the load carrier system is arranged on the motor vehicle bodywork so as to be able to be displaced or pulled out, for instance, in the longitudinal direction of the vehicle and accordingly constructed to be pulled out of a motor vehicle rear. The energy supply device may have a charging unit, which is constructed to charge at least one accumulator of the object that can be carried. The energy supply device is in this instance supplied by the on-board electrical system of the motor vehicle. The load carrier system may have at least one plug type connection for electrically coupling the object that can be carried to the energy supply device. There may be provision for an electrical coupling of the carrier frame, and the object which is intended to be secured thereto, to be integrated in a mechanical securing device, by means of which the object can be fixed to the carrier frame. There is additionally provision for the load carrier system to have a control device, or to be coupled to a control device, which controls the energy supply to the object in accordance with the movement state of the motor vehicle. The control device is, for example, configured to supply the object that is secured to the load carrier system and which is carried with electrical energy only when, for example, the motor vehicle has excess electrical energy.

SUMMARY

An object of the present disclosure is to provide an improved carrier, an improved motor vehicle having this carrier and an improved small vehicle as components for an improved mobility unit.

The carrier according to the disclosure is suitable to fit to a motor vehicle and to receive a small vehicle. The carrier comprises a console on which the small vehicle can be arranged. According to the disclosure, the carrier comprises a carrier coupling component, which is constructed to be connected in a positive-locking manner to a small vehicle coupling component of the small vehicle above the console.

Consequently, it is advantageously possible to couple the small vehicle, for example, a bicycle, in a rapid, simple and secure manner to the carrier.

In an advantageous embodiment of the carrier according to the disclosure, there is arranged in the carrier coupling component at least one contact element, in which an electrical connection can be produced between the motor vehicle and the small vehicle.

It is consequently made possible for the small vehicle to be supplied with electric current and for an accumulator of the small vehicle to be charged. In addition, it is made possible for data to be exchanged.

In another advantageous embodiment of the carrier according to the disclosure, the carrier comprises a fixing device, which is constructed to connect the carrier coupling component and a small vehicle coupling component to each other in a fixing state. In the fixing state, the small vehicle can be transported on the carrier.

Consequently, the small vehicle can be brought into the transportable state in a simple manner.

In another advantageous embodiment of the carrier according to the disclosure, the fixing device has a drive, in which the fixing device can be placed in the fixing state by the drive.

A user consequently does not have to carry out the fixing himself. The operating comfort for the user is consequently increased.

In another advantageous embodiment of the carrier, according to the disclosure, the carrier comprises an actuation device, in which the drive of the fixing device can be switched.

Consequently, the operating comfort for the user is further increased. They need only to move the small vehicle toward the console, and to actuate the actuation device. The fixing device subsequently fixes the small vehicle independently to the carrier.

In another advantageous embodiment of the carrier according to the disclosure, the carrier comprises a ramp and is constructed in such a manner that the ramp can be positioned alternately in a rest position and in a position for use. In the rest position, the ramp is at least partially surrounded by the console and forms an inclined member in the position for use. The ramp may be electrically driven.

With the ramp, there is provided an inclined upward travel member or inclined downward travel member, in which the small vehicle can be more readily moved onto, or from the carrier. Since the ramp can be stored inside the carrier, the ramp is ready for use at any time. The electric drive also enables automatic actuation of the ramp.

In another advantageous embodiment of the carrier according to the disclosure, the console is provided with at least one recess for receiving a wheel of the small vehicle.

Consequently, the small vehicle is arranged lower, and the console is positioned in the region between the wheels of the small vehicle, closer to the small vehicle. The small vehicle coupling component thereby has to be arranged with less spacing from the console. The carrier is thereby constructed in a more compact manner. Additionally, the lower center of gravity is advantageous for the driving properties of the motor vehicle with the carrier mounted and small vehicle positioned.

The carrier according to the disclosure is preferably secured to a motor vehicle according to the disclosure. The motor vehicle comprises a bumper, and, in an advantageous embodiment, is constructed in such a manner that the carrier can alternately be positioned in a rest position and in a position for use. In the rest position, the carrier is in this instance at least partially surrounded by the bumper of the motor vehicle.

Consequently, the carrier is available at any time and can be rapidly used. In addition, the motor vehicle has a more pleasing visual appearance.

The motor vehicle comprises an on-board electrical system having an accumulator. In another advantageous embodiment of the motor vehicle according to the disclosure, the carrier is electrically connected to the on-board electrical system.

It is consequently made possible for the small vehicle, which is fitted to the carrier, to be supplied with electric current, and, in particular, for an accumulator of the small vehicle to be charged.

The small vehicle according to the disclosure comprises an electric motor that is suitable to at least alternatively drive the small vehicle and a small vehicle accumulator. According to the disclosure, the small vehicle comprises a small vehicle coupling component that is constructed to be connected to a carrier coupling component of a carrier. In particular, the small vehicle is a bicycle, and the small vehicle coupling component is arranged on a frame between a front wheel and a rear wheel of the bicycle.

Consequently, a small vehicle that fits the carrier according to the disclosure is advantageously provided.

In an advantageous embodiment of the small vehicle according to the disclosure, the small vehicle comprises at least one locking device that is constructed to lock components of the small vehicle to each other in a locking state. The locking state can be produced, in particular, at the same time as the fixing state.

Consequently, operation for the user is simplified, and theft protection is increased.

The motor vehicle according to the disclosure with the carrier according to the disclosure forms, together with the small vehicle according to the disclosure, the mobility unit according to the disclosure.

The mobility unit consequently combines advantages of the components thereof, and provides the user with simple and ergonomic handling. The small vehicle is thereby more readily and universally available for the user. More frequent use of the small vehicle in place of the motor vehicle would represent more efficient mobility, which saves resources and could improve the fitness of the user.

Other advantages of the present disclosure will be appreciated from the detailed description and the drawings. The disclosure is explained in greater detail with reference to the drawings and the following description. In the drawings:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
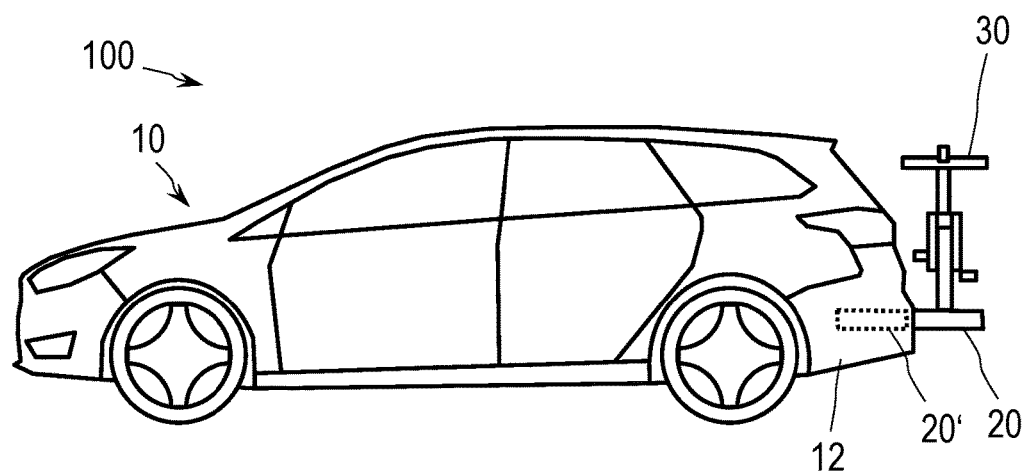
FIG. 1 shows a mobility unit in an exemplary embodiment with a motor vehicle in an exemplary embodiment, a carrier in an exemplary embodiment and a small vehicle in an exemplary embodiment.
Figure 4:
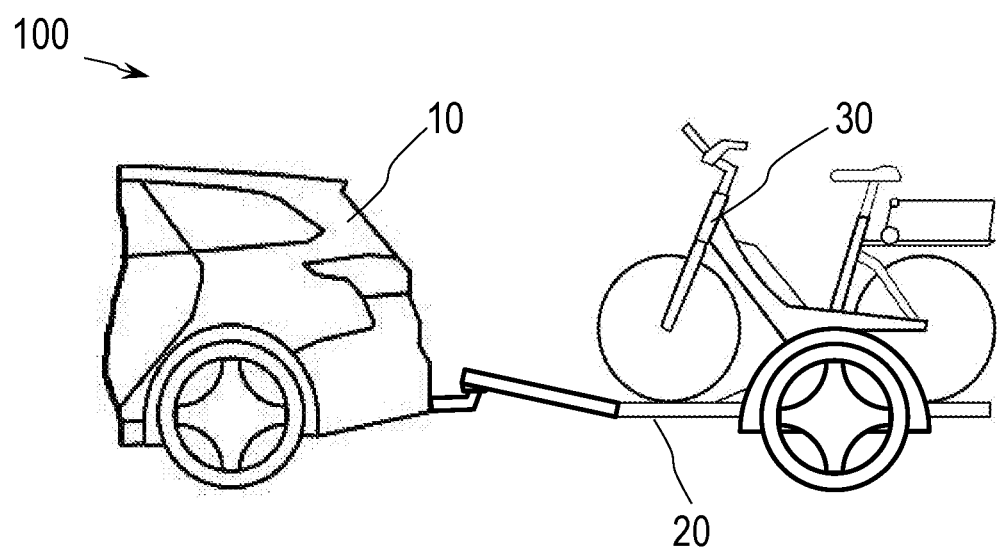
FIG. 4 shows the mobility unit in another exemplary embodiment.

In FIGS. 1 and 4, the mobility unit 100 according to the disclosure is schematically illustrated in a first and second exemplary embodiment, respectively. The mobility unit 100 comprises a motor vehicle 10, according to the disclosure, which is provided with a carrier 20 according to the disclosure, and a small vehicle 30 according to the disclosure that can be or is connected to the carrier 20.

The motor vehicle 10 and the small vehicle 30 differ in the context of the present disclosure in that the small vehicle 30 is smaller and lighter than the motor vehicle 10 and can be transported by the motor vehicle 10. The small vehicle 30 thus has a mass that is below a loading limit and/or towed load limit of the motor vehicle 10. The small vehicle 30 has a separate drive, which is an electric drive and constructed to drive the small vehicle 30 at least in a supporting manner. The motor vehicle 10 is constructed to transport the small vehicle 30. To this end, the motor vehicle 10 is provided with the carrier 20 that is constructed to connect the small vehicle 30 to the motor vehicle 10 mechanically, and, in particular, also electrically. The carrier 20 is constructed to receive the small vehicle 30, or a plurality of such small vehicles 30. The carrier 20 may in this instance be rigidly connected to the motor vehicle 10 and arranged in such a manner that the small vehicle 30 can be received in an inner space of the motor vehicle 10 or outside the inner space of the motor vehicle 10. In this manner, it is illustrated in FIG. 1. In addition, it is possible for the carrier 20 to be movingly connected to the motor vehicle 10. In this instance, the carrier 20 is, in particular, constructed as a trailer and coupled to a trailer coupling of the motor vehicle 10. The carrier 20 that is constructed as a trailer is provided with a separate chassis. In this manner, it is illustrated in FIG. 4.

In FIG. 1, the carrier 20 is arranged by way of example in a rear region of the motor vehicle 10 in such a manner that it can be positioned alternately in a rest position, and in a position for use. The carrier 20 can, in particular, be moved from the rest position into the position for use and vice versa. In particular, the carrier 20 can be pulled out and/or moved out of the rest position into the position for use, or pushed and/or moved from the position for use into the rest position. In the position for use, the small vehicle 30 can be fixed, in this instance, outside the inner space of the motor vehicle 10 behind a tailgate of the motor vehicle 10 to the carrier 20. The rest position is shown by means of the carrier 20', which is illustrated with dashed lines. In the rest position, the carrier 20' is at least partially concealed by a bumper of the motor vehicle 10.

The motor vehicle 10 has an on-board electrical system 11 with a motor vehicle accumulator. In particular, the motor vehicle 10 has an electric vehicle drive for driving the motor vehicle 10. In order to control the electrical devices, the motor vehicle is provided with a motor vehicle control device. The carrier 20 is preferably connected to the on-board electrical system 11, in particular, to the motor vehicle accumulator. The small vehicle 30 is preferably integrated in an on-board electrical system management system of the motor vehicle 10. In particular, the small vehicle 30 is integrated in the on-board electrical system of the motor vehicle 10 in such a manner that a small vehicle accumulator 31 can be charged. The small vehicle 30 can additionally be integrated in the on-board electrical system in such a manner that the small vehicle accumulator 31 can supply electrical devices of the motor vehicle 10 with electrical energy, in particular, also the electrical vehicle drive.

The carrier 20 comprises a console 22, on which the small vehicle 30 can be arranged in a transport position. According to the disclosure, the carrier 20 comprises a carrier coupling component 24 that is constructed to be connected to a small vehicle coupling component 34 of the small vehicle 30. The two coupling components 24, 34 produce, in particular, in a coupled state, a positive-locking connection. The carrier coupling component 24 is in this instance positioned above the console 22. The carrier coupling component 24 may, for example, be adjustable in terms of height. The small vehicle 30 is located in the transport position when the two coupling components 24, 34 are positioned with respect to each other in such a manner that a fixing of the two coupling components 24, 34 to each other can take place. In particular, the two coupling components 24, 34 are in engagement with each other in the transport position. The transport position is intended to be differentiated from the transportability of the small vehicle 30. The transportability is achieved by the fixing of the coupling components 24, 34 to each other.

The two coupling components 24, 34 are constructed in such a manner that, in order to connect the carrier coupling component 24 to the small vehicle coupling component 34, the small vehicle coupling component 34 can be pushed or placed in the carrier coupling component 24.

Figure 2:
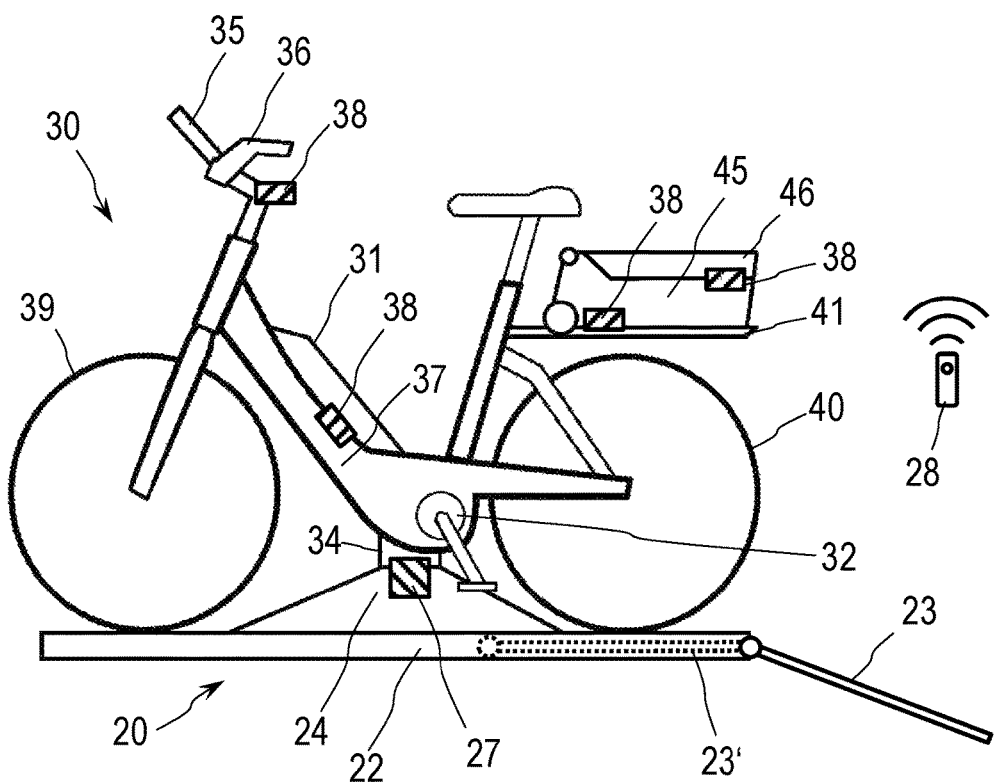
FIG. 2 shows the small vehicle on the carrier.
Figure 3:
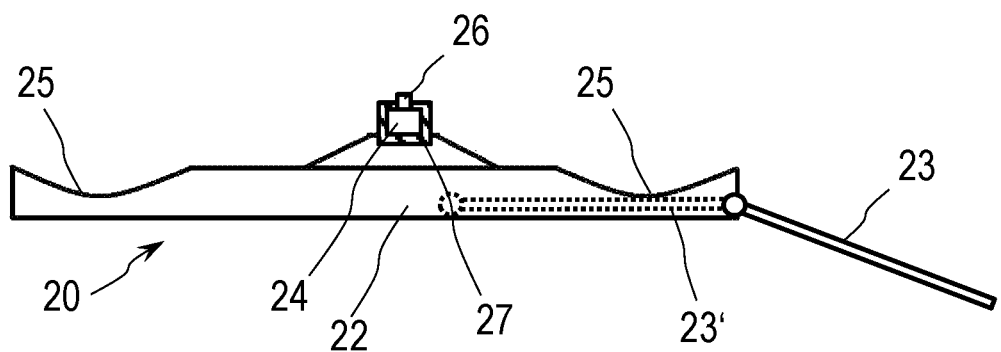
FIG. 3 shows the carrier in another exemplary embodiment.

The carrier 20 has, in particular, a ramp 23. In FIGS. 2 and 3, the ramp 23 is arranged in such a manner that it can be positioned in a rest position, or in a position for use. The ramp 23 can be moved, in particular, from the rest position into the position for use and vice versa. In particular, the ramp 23 can be pulled and/or moved out of the rest position into the position for use or pushed and/or moved from the position for use into the rest position. In the position for use, the ramp 23 forms an inclined member that facilitates pushing the small vehicle 30 upward or downward. The rest position is shown by the ramp 23', which is illustrated with dashed lines. In the rest position, the ramp 23' is at least partially stored inside the console 22. The ramp 23 may be electrically driven so that the ramp 23 can be moved out of the position for use into the rest position and/or from the rest position into the position for use. In particular, the carrier 20 is constructed in such a manner that the ramp 23 automatically moves from the position for use into the rest position if it has been identified that the carrier coupling component 24 is fixed to the small vehicle coupling component 34.

At least one contact element 26 is integrated in the carrier coupling component 24. The small vehicle coupling component 34 also has at least one such contact element 26. The two contact elements 26 correspond to each other. The coupling components 24, 34 are constructed in such a manner that, when the small vehicle 30 is in the transport position, an electrical connection with respect to the coupling components 24, 34 is formed through the contact elements 24, 34. The electrical connection serves to integrate the small vehicle 30 in the on-board electrical system of the motor vehicle 10, in particular the power supply of the small vehicle 30, and can additionally be used for data exchange.

The carrier 20 comprises at least one fixing device 27 that is constructed to fix the small vehicle 30 to the carrier 20. The fixing device 27 is constructed to, alternately, have a fixing state and a release state. The fixing device 27 is constructed to fix components such that in the release state, the components can be moved relative to each other, and, in the fixing state, the components can be substantially immovable relative to each other. In particular, in the fixing state, the carrier coupling component 24 is securely connected to the small vehicle coupling component 34 and, in the release state, the carrier coupling component 24 can be released from the small vehicle coupling component 34. In the fixing state, the small vehicle 30 can be transported. In the release state, the small vehicle 30 can be removed from the carrier 20. The fixing device 27 is preferably arranged in the carrier coupling component 24. The fixing device 27 can be manually operated and/or have a drive. The drive of the fixing device 27 is, in this instance, in particular, a mechanical, electrical and/or hydraulic drive. The drive of the fixing device is, in particular, constructed to move the fixing device 27 from the release state into the fixing state. The drive of the fixing device 27 is, in particular, constructed to move the fixing device 27 from the fixing state into the release state. The carrier 20 is, in particular, constructed in such a manner that the at least one fixing device 27 moves independently into the fixing state when it has been identified that the carrier coupling component 24 is connected to the small vehicle coupling component 34, or when the contact element 26 of the carrier is in contact with the contact element of the small vehicle 30. The fixing device 27 may in this instance be controlled by a control device of the motor vehicle 10, the small vehicle 30, or the carrier 20. The fixing device 27 is, preferably, integrated in the carrier coupling component 24.

The carrier 20 may define, in the console 22, at least one recess 25 in which a wheel 39, 40 of the small vehicle 30 can be arranged. In the embodiment shown in FIG. 3, the console 22 comprises two recesses 25. Consequently, the small vehicle 30 is positioned lower in the transport position.

The carrier 20 may comprise an actuation device 28 to switch the fixing device 27. The actuation device 28 is, preferably, configured for one-handed operation. The actuation device 28 is a mechanical positioning element, such as, for example, a lever that is arranged on the fixing device 27. The actuation device 28 may, in an electrically and/or hydraulically driven fixing device 27, for example, be a button or a switch such that actuation of the button or switch activates the drive of the fixing device 27. The actuation device 28 may, in this embodiment, be arranged directly on the motor vehicle 10, or be a mobile telephone or a remote-control unit, as shown in FIG. 2. In addition, it is conceivable for the actuation device 28 to be constructed to be automatically activated when it has been identified that the carrier coupling component 24 is connected to the small vehicle coupling component 34, or when the contact element 26 of the carrier is in contact with the contact element of the small vehicle 30, or when a specific gesture, for example, a foot movement of the user below the console 22, has been identified. The fixing device 27 may be constructed in such a manner that, in the release state after the actuation device 28 has been activated, the fixing device 27 completely and automatically brings about the fixing of the carrier coupling component 24 and the small vehicle coupling component 34, and, consequently, changes into the fixing state. The fixing device 27 may be constructed in such a manner that, in the fixing state after the actuation device 28 has been activated, the fixing device 27 completely and automatically releases the fixing of the carrier coupling component 24 and the small vehicle coupling component 34, and, consequently, changes into the release state. The fixing device 27 may, in this instance, be controlled by a control device of the motor vehicle 10, the small vehicle 30, or the carrier 20.

The drive of the ramp 23 may also be able to be controlled by means of the actuation device 28. The carrier 20 may thus be constructed to deploy the ramp 23 when the fixing device 27 is switched into the release state, or to retract the ramp 23 when the fixing device 27 is switched into the fixing state.

The small vehicle 30 is, in particular, a two-wheeled vehicle, such as a bicycle or Pedelec; as illustrated in FIGS. 1 and 2. Alternatively, the small vehicle 30 may, for example, be a moped, a motorcycle, a scooter, a self-balancing scooter, a wheelchair or the like. The drive of the small vehicle 30 comprises an electric motor 32 that is supplied with electrical power by the small vehicle accumulator 31. According to the disclosure, the small vehicle 30 has the small vehicle coupling component 34 that is constructed to be connected to a carrier coupling component 24 of a carrier 20. The small vehicle coupling component 34 has a shape that corresponds to the carrier coupling component 24.

In the embodiment illustrated of the small vehicle 30 as a bicycle, which, as is conventional, comprises a front wheel 39, a rear wheel 40, a frame 37 and a handlebar 36, the small vehicle coupling component 34 is arranged on the frame 37 between the front wheel 39 and the rear wheel 40 facing downward. The electric motor 32 is, in this instance, positioned on a bottom bracket bearing of the small vehicle 30. The electric motor 32 may also be integrated as a wheel hub motor in the front wheel 39, or the rear wheel 40. The small vehicle accumulator 31 is, in the embodiment illustrated, positioned on the frame 37 so as to be able to be removed. The small vehicle 30 shown, additionally, has a luggage carrier 41 that is constructed to receive a container 45. Furthermore, the small vehicle 30 shown comprises a small vehicle user interface 35 that is constructed to provide information, for example, relating to a charging state of the small vehicle accumulator 31, a position of the small vehicle 30, a position of the motor vehicle 10, a completed trip, vital data of the user or also weather data. The small vehicle user interface 35 may further be constructed to communicate with a motor vehicle user interface, a mobile telephone, and/or fitness tracker. In addition, the actuation device 28 may be integrated in the small vehicle user interface 35 so that the fixing device 27 of the carrier 20 can be switched via the small vehicle user interface 35.

The small vehicle 30 further comprises, in particular, at least one locking device 38. The locking device 38 is constructed to alternately have a locking state and an open state. The locking device 38 is constructed to lock components that can be released from each other in the open state and locked to each other in the locking state. The locking device 38 is, preferably, electrically operated. The small vehicle 30 is, in particular, constructed in such a manner that the at least one locking device 38 is placed in a locking state when it has been identified that the carrier coupling component 24 is fixed to the small vehicle coupling component 34. The locking device 38 may also be able to be activated or deactivated with the actuation device 28. In order to control the at least one locking device 38, the small vehicle 30 has, in particular, a small vehicle control device. In the embodiment illustrated in FIG. 2, the small vehicle 30 comprises, by way of example, four locking devices 38. One of the locking devices 38 may be arranged on the luggage carrier 41 and constructed to lock the container 45 to the luggage carrier 41 in the locking state. Another of the locking devices 38 may be arranged on the frame 37 and constructed to lock the small vehicle accumulator 31 to the frame 37 in the locking state. Another of the locking devices 38 may be arranged on the small vehicle coupling component 34 and constructed to lock the small vehicle 30 to the carrier 20 in the locking state. Another of the locking devices 38 may be arranged on the frame 37 and constructed to lock the small vehicle 30 to the carrier 20 in the locking state. Another of the locking devices 38 may be arranged on the handlebar 36 and constructed to lock the small vehicle user interface 35 to the handlebar 36 in the locking state. Another of the locking devices 38 may be arranged in the container 45 and constructed to lock a flap 46 for opening the container 45 in the locking state.

The carrier 20 may also have such a locking device 38, for example, arranged in the console 22 and constructed to lock a wheel 39, 40 of the small vehicle 30 to the carrier 20 in the locking state.

The container 45 is preferably a component of the small vehicle 30 that can be released from the small vehicle 30. The container is, in particular, constructed with the form and function of a Topcase, and has the flap 46 for opening. In addition, the container 45 may be provided with rollers, which enables use in the manner of a trolley bag when the container 45 is released from the luggage carrier 41.

Although the disclosure has been illustrated and described in greater detail by the preferred embodiments, the disclosure is not limited by the examples disclosed and other variations can be derived therefrom by the person skilled in the art, without departing from the protective scope of the disclosure.

The figures are not necessarily true to detail and true to scale and may be illustrated so as to be enlarged or reduced in size in order to provide a better overview. Therefore, functional details which are disclosed here are not intended to be understood to be limiting, but instead only as an illustrative basis which provides the person skilled in the art in this field of technology with instructions for using the present disclosure in a varied manner.

The term "and/or" used herein when it is used in a series of two or more elements means that each of the elements set out can be used alone or any combination of two or more of the elements set out can be used. If, for example, there is described a composition which contains the components A, B and/or C, the composition may contain A alone; B alone; C alone; A and B in combination; A and C in combination; B and C in combination; or A, B and C in combination.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A motor vehicle carrier, comprising:
   a console that arranges a small vehicle;

first and second coupling components of the carrier and the small vehicle, respectively, that are constructed to be connected in a positive-locking manner above the console;

a ramp, positioned alternately between rest and use positions, that is at least partially surrounded by the console in the rest position and forms an inclined member in the use position; and a fixing device that is configured to connect the first and second coupling components in a fixing state, wherein the fixing device includes a drive to place the fixing device in the fixing state.

2. The motor vehicle carrier as claimed in claim 1, further comprising at least one contact element disposed on the first coupling component, and configured to produce an electrical connection between the motor vehicle and the small vehicle.

3. The motor vehicle carrier as claimed in claim 1 further comprising an actuation device to switch the fixing device from the fixing state.

4. The motor vehicle carrier as claimed in claim 1, wherein the ramp is electrically driven.

5. The motor vehicle carrier as claimed in claim 1, wherein the console defines at least one recess that receives a wheel of the small vehicle.

6. A vehicle comprising:

a carrier configured to secure a small vehicle to a console using first and second coupling components of the carrier and the small vehicle, respectively, that are constructed to be connected in a positive-locking manner above the console, wherein a ramp, positioned alternately between rest and use positions, forms an inclined member in the use position such that a recess defined in the console receives a wheel of the small vehicle, wherein the carrier includes a fixing device that is configured to connect the first and second coupling components in a fixing state and an actuation device to switch the fixing device from the fixing state.

7. The vehicle as claimed in claim 6, wherein the ramp is a bumper that is at least partially surrounded by the carrier in the rest position.

8. The vehicle as claimed in claim 6, wherein the second coupling component is arranged on a frame between a front wheel and a rear wheel of a bicycle.

9. The vehicle as claimed in claim 6 further comprising an on-board electrical system that is electrically connected to the carrier and includes an accumulator.

10. The vehicle as claimed in claim 9, wherein the carrier includes at least one contact element disposed on the first coupling component, and configured to produce an electrical connection between the on-board electrical system and the carrier.

11. The vehicle as claimed in claim 6, wherein the fixing device includes a drive to place the fixing device in the fixing state.

12. A mobility unit, comprising:

an electric motor configured to at least alternatively drive a small vehicle and a small vehicle accumulator;

a small vehicle coupling component that is connected to a carrier coupling component of a carrier for a vehicle in a positive-locking manner above a console for the carrier that defines a recess to receive a wheel of the small vehicle, wherein the carrier includes a fixing device that is configured to connect the small vehicle coupling component and carrier coupling component in a fixing state and an actuation device to switch the fixing device from the fixing state; and a ramp, positioned alternately between rest and use positions, that forms an inclined member in the use position between the console and the wheel.

13. The mobility unit as claimed in claim 12, wherein the small vehicle coupling component is arranged on a frame between a front wheel and a rear wheel of a bicycle.

14. The mobility unit as claimed in claim 12, wherein the carrier coupling component includes at least one contact element configured to produce an electrical connection between the vehicle and the small vehicle.

15. The mobility unit as claimed in claim 12 further comprising at least one locking device that locks components of the small vehicle in a locking state.

16. The mobility unit as claimed in claim 15, wherein the locking device includes a drive to actuate the locking device in the locking state.

17. The mobility unit as claimed as claim 16 further comprising a motor to actuate the locking device into the locking state.

18. The mobility unit as claimed in claim 12, wherein the fixing device includes a drive to place the fixing device in the fixing state.

* * * * *